United States Patent [19]

Lunazzi

[11] Patent Number: 4,822,217

[45] Date of Patent: Apr. 18, 1989

[54] ASSEMBLAGE OF COMPONENTS FOR THE DRIVE SYSTEM OF THE WORKTABLE IN AN AUTOMATIC GEAR CUTTING MACHINE

[75] Inventor: Alessandro Lunazzi, Bologna, Italy

[73] Assignee: C.I.M.A. Costruzioni Italiane Macchine Attrezzi S.p.A., Bologna, Italy

[21] Appl. No.: 153,972

[22] Filed: Feb. 9, 1988

[30] Foreign Application Priority Data

Feb. 17, 1987 [IT]  Italy ................................. 3351 A/87

[51] Int. Cl.⁴ .............................................. B23F 5/00
[52] U.S. Cl. ......................................... 409/11; 409/15
[58] Field of Search ....................... 409/11, 12, 51, 59, 409/13–24

[56] References Cited

U.S. PATENT DOCUMENTS 4,318,648  3/1982  Deprez ................................. 409/11
4,708,544  11/1987  Faulstich et al. ...................... 409/11

Primary Examiner—Léon Scott, Jr.
Attorney, Agent, or Firm—Balogh, Osann, Kramer, Dvorak, Genova & Traub

[57] ABSTRACT

Problems connected with control of the worktable in automatic gear cutting machinery are overcome by adoption of a drive system incorporating two speed reductions, the first of which a worm and wheel, the second consisting in a cylindrical gear pair with parallel shafts, one of the two members of which is backlash-compensating and split into two coaxial sections; the larger of the two cylindrical gears turns as one with the worktable.

7 Claims, 1 Drawing Sheet

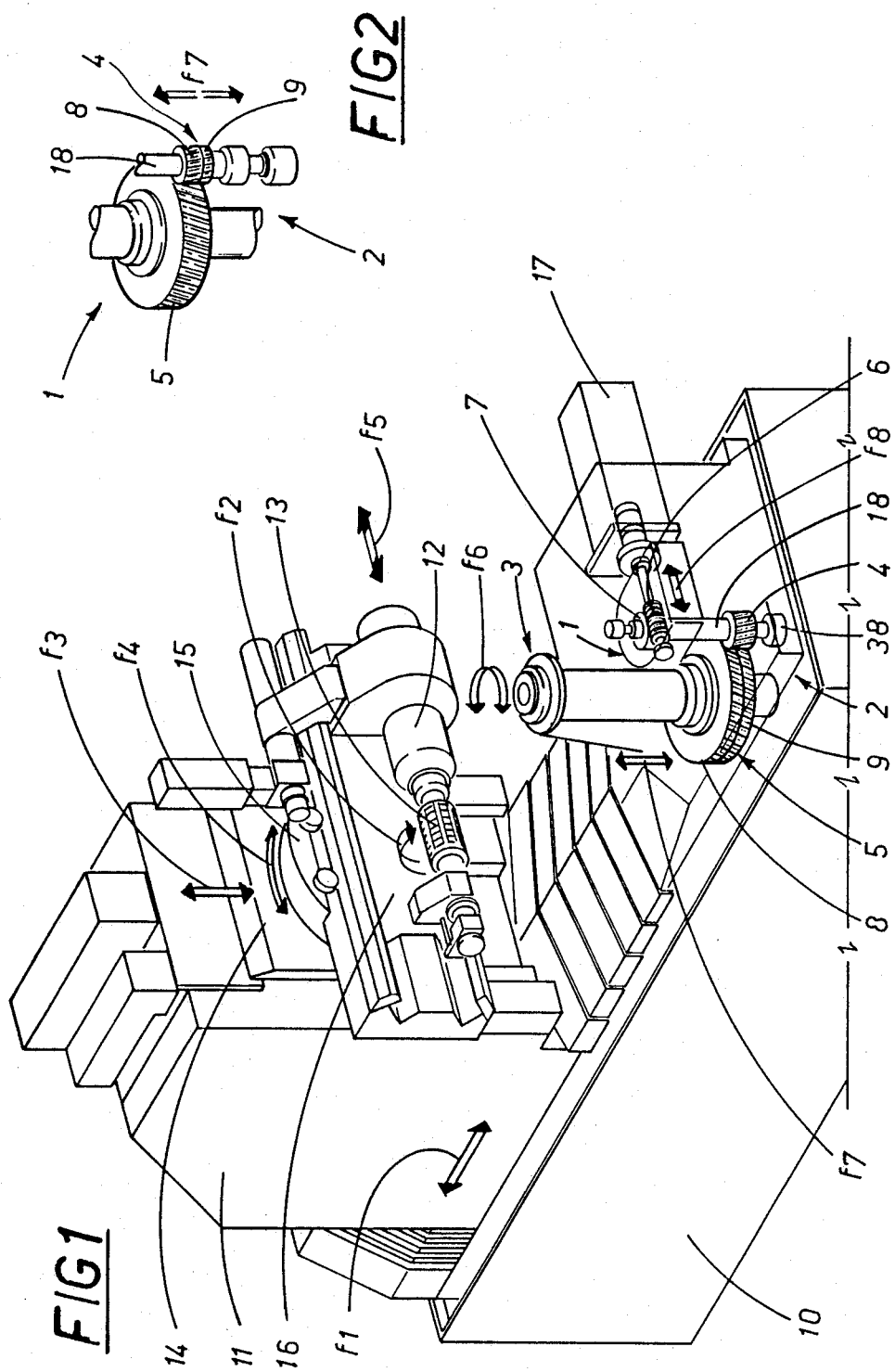

ASSEMBLAGE OF COMPONENTS FOR THE DRIVE SYSTEM OF THE WORKTABLE IN AN AUTOMATIC GEAR CUTTING MACHINE

BACKGROUND OF THE INVENTION

The invention disclosed relates to an assemblage of components for the drive system of the worktable in an automatic gear cutting machine.

A fundamental requirement exists in gear cutting machines for synchronization between the movement of the rotatiny tool, or hob, and that of the work, to the end of ensuring precise geometry and spacing of the teeth in relation to the pitch diameter of the formed gear, whatever the type of tooth -viz, spur or helical, relieved, crowned, etc.

In conventional machines, synchronized movement of this nature is achieved by way of a mechanical linkage that connects the tool spindle and the table carrying the work.

Machine tools of the type in question generally incorporate a column that carries the tool spindle and can be moved toward and away from the worktable. The tool, which is generally a straight (or taper) hob, is carried in such a way that it is rotatable about its own axis, and adjustable for position in the vertical direction, along its own longitudinal axis, and about a horizontal axis, so as to permit of forming helical, spur, relieved and other types of gear teeth.

The various movements accomplished by the tool must therefore be synchronized exactly with the movement of the work if correct tooth geometry of the gears in production is to be ensured.

Hitherto, almost all the manufacturers of gear cutting machinery have adopted similar expedients for the final stage of the aforementioned mechanical linkage (numerically controlled or otherwise), or at all events, of the worktable drive, at the point where high precision and reversibility of the drive are both essential requirements; such expedients are based generally on the use of one or two worm gear pairs, the final worm wheel being rigidly associated with the worktable (e.g. as in U.S. Pat. No. 3,232,169 and in U.S. Pat. No. 3,318,193).

Arrangements of this general type are beset by the drawbacks of excessive wear which occurs at high speed operation, and the rather mediocre quality of the average worm wheel, which is hob finished and keyed direct to the worktable, with the result that errors are also transmitted direct to the worktable. In addition, the precision demanded of conventional machines is often rendered unobtainable through the effect of overheating, which occurs mainly through excessive friction or inadequate cooling. A build-up of heat beyond certain limits will in fact lead to distortion of the components affected, which results ultimately in loss of precision.

These problems are tackled in U.S. Pat. No. 4,435,110 by adopting a hypoid gear pair, installed at the final stage of the linkage connecting with the worktable. In this patent system, the hypoid pair operates in association with two cylindrical gears associated rigidly with the worktable. The hypoid gears serve to change the direction of movement produced by the linkage and to reduce speed through the worktable drive line, whilst the cylindrical gears reduce the final speed of the worktable to suit the rotational speed of the hob.

With an arrangement such as this, one achieves a reduction in the manufacturing costs of gear cutting machinery, inasmuch as the hypoid gear drive is less expensive than drives utilizing worm gear pairs with worm wheel and worktable directly associated, and provides a wider range of speeds.

In addition to the train of gears described, the patent system in question also comprises a second train comprising a bevel gear pair and a cylindrical pinion; this second linkage is driven independently, the cylindrical pinion meshing with the cylindrical gear of the worktable, and serves to take up any backlash that may be created when rotation of the table is reversed.

A transmission such as this is complicated and costly, however, and difficulties in adjustment tend to compromise continuity of precision.

In other gear cutting machines, especially those where rotation of the worktable is controlled by a motor independent from that of the hob, though with a direct connection effected between the two motors, e.g. through a numerical control, use is made of two cylindrical gear pairs with parallel axes (pinion and wheel) in order to obtain a sharp reduction in the speed of the worktable, which turns as one with the wheel of the final pair.

In this type of transmission, one also has a second train that is driven from the wheel of the first pair and drives the wheel associated with the worktable.

Whilst it is true that one obtains a good degree of precision and a good speed range in this fashion, the drive is rendered cumbersome. More exactly, the driving pinion is keyed direct to the shaft of the motor, and as the worktable is vertically disposed and parallel gears are adopted, the motor must also be mounted vertically; this signifies bulk, reduced access, as the motor is housed in the casting of the machine frame, insufficient heat exchange, leading to hot spots at the work areas, and difficulties in servicing the machine.

Accordingly, the object of the invention is to embody a simply, inexpensive drive system for the worktable of an automatic gear cutting machine, from which the aforementioned drawbacks are absent.

SUMMARY OF THE INVENTION

The stated object is achieved with an assemblage of components as disclosed and claimed herein.

The components in question comprise a worm gear pair, and a cylindrical gear pair of which the two members are of dissimilar diameter, one serving to take up backlash; the larger member is associated rigidly and coaxially with the worktable.

Among the advantages afforded by the invention are that precision peformance is guaranteed in the long term, and a more compact embmodiment of the gear cutting machine is obtained.

BRIEF DESCRIPTION OF THE DRAWINGS

The invention will now be described in detail, by way of example, with the aid of the accompanying drawings, in which:

FIG. 1 is the perspective of a gear cutting machine provided with the assemblage of components according to the invention, illustrated with certain parts cut away or omitted better to reveal others;

FIG. 2 is a perspective illustrating an alternative embodiment of a part of the assemblage of components according to the invention.

DESCRIPTION OF THE PREFERRED EMBODIMENTS

In the drawings, FIG. 1 shows an automatic gear cutting machine, consisting essentially in a bed 10 that supports a column 11 at one end, and at the remaining end, a worktable 3. The column 11 can be traversed along the bed 10 toward and away from the table 3 in the direction of the arrow denoted f1 and carries a tool spindle 12 mounted to the side facing the table 3.

13 denotes the gear cutter tool, generally a straight (or taper) hob, which is mounted at right angles to the direction in which the column 11 is traversed, and rotatable about its own longitudinal axis (arrow f2).

The spindle 12 is carried by the column 11 on a set of slides 14, 15 and 16 which enable the spindle assembly to be (a) traversed en bloc in the vertical direction (arrow f3), (b) rotated about a horizontal axis disposed parallel to the direction in which the column 11 traverses (arrow f4), and (c) traversed sideways along its own longitudinal axis (arrow f5), respectively.

The worktable 3 occupies a fixed position at the end of the bed 10 remote from and inaccessible to the column 11, and is rotated about its own vertical longitudinal axis (arrow f6) by an assemblage of components the operation of which is synchronized with the movement of the hob 13.

According to the invention, the assemblage of components by which the table 3 is driven comprises:
- a first speed reduction unit, denoted 1, the shafts of which are disposed at right angles;
- a second speed reduction unit denoted 2, the shafts of which are disposed parallel.

The first reduction 1 is in direct receipt of drive from a motor 17, disposed horizontally, and preferably, at right angles to the direction in which the column 11 is traversed; operation of the motor 17 will be synchronized (by way of numerical control media) with that of the motors (not shown) which position the column 11 and the spindle 13. More exactly, 6 denotes a worm, coaxial with and driven directly by the worktable motor 17, and 7 denotes a worm wheel, keyed to a vertical shaft 18 carried by the bed 10 of the machine.

The second reduction 2 consists in a cylindrical gear pair the members of which are denoted 4 and 5; the smaller cylindrical member, or pinion 4 is keyed to the vertical shaft 18, whilst the larger member, or wheel 5 is rigidly attached to the bottom of the worktable 3, and turns as one therewith.

With an arrangement such as this linking the worktable 3 and its motor 17, one has two speed reductions, in which one of the members 4 or 5 of the cylindrical gear pair is backlash-compensating, and thus, split into two coaxial sections 8 and 9. Either the wheel 5 or the pinion 4 of the pair may perform the backlash-compensating role to equally good effect, as the two embodiments of FIGS. 1 and 2 illustrate, respectively.

The cylindrical pinion 4 and wheel 5 may have spur or helical teeth; helical is preferred in the interests of quieter running and smoother operation, and indeed it is this type of toothing that is shown in the drawings.

In the case of the helical gears illustrated, backlash is taken up between the two sections 8 and 9 of the pinion 4 or wheel 5 by enabling these two sections to shift in relation to one another along their common axis of rotation, as indicated by the arrow denoted f7.

In the event that the pinion 4 and wheel 5 have spur teeth, backlash can be taken up by enabling the two sections 8 and 9 to rotate in relation to one another about their common axis; such an expedient is also applicable in the case of helical gears.

Again, the backlash-compensating feature could be provided by embodying the two sections 8 and 9 of the cylindrical pinion 4 or wheel 5 with a different number of teeth, for example, the one section having one tooth more than the other, and urging the two into contact, say, by means of a set of belleville springs adjustable for tension. Thus, the dissimilar speeds of rotation of the two sections will produce relative slip, in frictional contact, that takes up the gap between pinion 4 and wheel 5.

Should this particular expedient be applied to the larger member, i.e. the wheel 5, a singularly limited amount of heat would be generated, even in cases where the belleville springs might be loaded to a set value, in view of the low speed at which slip occurs. By contrast, application of the same expedient to the pinion 4 would result in more heat being generated, given the higher speed at which slip will occur, though in this instance the heat can be dissipated by cooling; also, the more readily accessible position of the pinion would permit of adjusting the tension of the compression springs to suit requirements.

According to the invention, the precision of the automatic gear cutting machine is enhanced still further by adoption of a high efficiency worm 6 that is also capable of backlash-compensating operation (arrow f8).

No further description is given of the backlash-compensating components, i.e. pinion 4 or wheel 5, and worm 6, since their embodiment and operation are embraced by the prior art in other fields.

With a worktable drive system acording to the invention, it becomes possible to attach the usual transducer or encoder (denoted 38, schematically) directly to the axis of the vertical shaft 18, and avoid errors deriving from transmission of the drive through the first reduction.

What is claimed is:

1. Assemblage of components for a drive system of a worktable in an automatic gear cutting machine, comprising:
    a first speed reduction unit with shafts disposed at right angles, consisting of a driving worm and a driven worm wheel;
    a second speed reduction unit with parallel shafts, driven by the worm wheel and driving the worktable, consisting of a pair of cylindrical gears dissimilar in diameter, one of which is backlash-compensating and split into two coaxial sections;
    a worktable, to which the larger of said cylindrical gears is coaxially and rigidly attached.

2. An assemblage of components as in claim 1, wherein said first reduction incorporates a high efficiency worm that is also backlash-compensating and split into two coaxial sections.

3. An assemblage of components as in claim 1, wherein said second reduction consists in a pair of cylindrical gears with helical teeth, one of which is split into two coaxial sections that can be shifted in relation to one another along their common axis of rotation.

4. An assemblage of components as in claim 1, wherein said second reduction consists in a pair of cylindrical gears having spur or helical teeth, one of which is split into two coaxial sections that can be rotated in relation to one another about a common axis.

5. An assemblage of components as in claim 1, wherein said second reduction consists in a pair of cylindrical gears having spur or helical teeth, one of which is split into two coaxial sections that are embodied with dissimilar numbers of teeth and urged into mutual contact by spring means.

6. An assemblage of components as in claim 1, wherein a pulse transducer is associated with said worktable for control purposes and is attached directly to the output shaft of said first speed reduction unit.

7. An assemblage of components as in claim 1, wherein an encoder is associated with said worktable for control purposes, and is attached directly to the output shaft of said first speed reduction unit.

* * * * *